United States Patent
Parriche

(10) Patent No.: US 6,603,841 B1
(45) Date of Patent: Aug. 5, 2003

(54) SYSTEM FOR CONSULTING AN ELECTRONIC MAIL SERVER

(75) Inventor: Olivier Parriche, Paris (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/622,700

(22) PCT Filed: Feb. 4, 1999

(86) PCT No.: PCT/FR99/00247

§ 371 (c)(1),
(2), (4) Date: Oct. 2, 2000

(87) PCT Pub. No.: WO99/43140

PCT Pub. Date: Aug. 26, 1999

(30) Foreign Application Priority Data

Feb. 23, 1998 (FR) .............................................. 98 02148

(51) Int. Cl.$^7$ ............................................. H04M 11/00
(52) U.S. Cl. .............................. 379/93.24; 379/110.01; 379/428.03
(58) Field of Search ...................... 379/93.24, 93.02, 379/88.08, 88.11, 88.12, 88.13, 88.14, 88.16, 88.17, 88.22, 110.01, 428.01, 428.02, 428.03, 433.06; 709/206

(56) References Cited

U.S. PATENT DOCUMENTS 5,825,854 A * 10/1998 Larson et al. .............. 379/67.1

FOREIGN PATENT DOCUMENTS

| FR | 2749122 A1 * 11/1997 | ............. G07F/7/08 |
| JP | 408097852 A * 4/1996 | ........... H04L/12/54 |

OTHER PUBLICATIONS

Shim; Mobile telephone integrated . . . Functionalities; Dec. 31, 1997, WO 97/50264.*

* cited by examiner

Primary Examiner—Melur Ramakrishnaiah

(57) ABSTRACT

A system for consulting an electronic mail server (20) in which a plurality of electronic messages addressed to a user are stored under data (a) identifying that user. The system includes an electronic memory card (40) for storing the identity data (a), and a telephone appliance (10) having a handset (15), an electronic memory card reader (14), a display screen (11), and keys (12a, . . . , 12h) giving access to options displayed on the screen (11). The telephone appliance (10) is suitable firstly for transmitting to the server (20) the identity data (a) as read by the electronic memory card reader (14), and secondly for displaying a list of received electronic messages returned from the server (20) and presented as options on the display screen (11). The user can select a message by pressing the corresponding access key (12a, . . . , 12h).

11 Claims, 3 Drawing Sheets

SYSTEM FOR CONSULTING AN ELECTRONIC MAIL SERVER

FIELD OF THE INVENTION

The present invention relates to a system for consulting an electronic mail server in which a plurality of electronic messages are recorded for a user under data identifying that user. A particularly advantageous application of the invention lies in the field of public telephony.

BACKGROUND OF THE INVENTION

Systems for consulting electronic mail servers are known that implement a personal computer fitted with software for managing electronic messages and connected to an electronic mail server. Those known systems enable messages to be consulted visually on the screen of the personal computer, with the user keying in identity data such as an electronic mail address and a password. Where necessary, a printer connected to the computer can provide a paper copy of received messages.

That type of consultation system nevertheless presents the drawback of being stationary and of requiring a large amount of equipment, a nearby power outlet, and a telephone line for connecting to the computer's modem. It is therefore not possible for a user to consult electronic mail from any location because the user must necessarily be on the premises where the personal computer is installed.

To remedy that drawback, proposals have been made for consultation systems that operate from a telephone appliance, in particular a mobile telephone, which enables a user who subscribes to an electronic mail server to access mail by dialing the server's number and then giving identity data. After the user has been recognized by means of said identity data, the server uses voice synthesis to communicate verbally the number, the title, and on request the contents of the messages most recently received for the user. Those voice consultation systems have the advantage for mobile telephone users, for example, of giving access to electronic mail from any location where it is possible to make a telephone connection to the server, and there is no need to have a personal computer or a power outlet. Naturally, with such systems, it is not possible to access the messages directly on a screen. Nevertheless, the cost of that service is less than the above-mentioned solutions which display message content.

Those known systems for consulting electronic mail nevertheless present several drawbacks.

Firstly there is a problem of security level, e.g. a password keyed directly onto the keypad, since there is a risk of that being observed surreptitiously. In addition, the line of the connected telephone network can be pirated for the purpose of intercepting messages it passes.

Furthermore, ergonomically, it will be understood that with such systems it quickly becomes awkward to remember the numbers of all of the messages to be consulted once the number of messages becomes large.

OBJECTS AND SUMMARY OF THE INVENTION

One object of the present invention is to provide a system for consulting an electronic mail server in which a plurality of electronic messages are recorded for a user under data identifying that user, which system provides improved security and ergonomy over known voice consultation systems, while nevertheless retaining the low cost nature of the service.

One aspect of the present invention is directed to a system for consulting an electronic mail server, comprises:

an electronic memory card for storing said identity data; and a telephone appliance comprising a handset, an electronic memory card reader, a display screen, and keys giving access to options displayed on said screen;

said telephone appliance being suitable firstly for transmitting to said server the identity data as read by the electronic memory card reader, and secondly for displaying a list of received electronic messages returned from the server and presented as options on the display screen, the user selecting a message by pressing the corresponding access key.

Thus, with the system of the invention it is possible permanently to display the list of messages on the display screen, to select one of them by means of the access key, to take cognizance of its content, and then to select another, and so on. It will be observed that the consultation system of the invention can be generalized to a large scale by being installed on public telephone networks, thereby contributing to the democratization of electronic mail, and also of the Internet, as desired by European governments. This ease of access is made even easier because, as mentioned above, the cost of such a solution remains significantly lower than that of conventional systems for consulting messages visually, implementing major pieces of equipment such as a personal computer, a modem, etc . . .

In general, the invention provides for the telephone appliance to be suitable for displaying the message selected by the user on its display screen, in order to enable the message which appears in written form on the screen merely to be read. However, the user can also select aural consultation of said message. To this end, the telephone appliance is suitable for delivering the selected message in voice form when the handset is taken off-hook. When the user picks up the handset of the telephone appliance, a voice synthesis device is implemented to supply an oral version of the message via the telephone line.

In a particular embodiment of the system of the invention, the telephone appliance also comprises means allowing the user to act on the selected message. For example, said action-taking means are reply means and/or transmission means enabling the user to reply to the previous selected message, or to forward it to at least one other addressee.

An advantage of the system of the invention lies in using an electronic memory card, which is particularly suitable for storing user identity data. In particular, in security terms, the password can be stored in the card, so the user does not need to key it in under the eyes of a third party. Furthermore, with an electronic memory card, it is possible to make the telephone line secure by encrypting messages, thereby disposing of possible piracy.

Furthermore, provision can be made for said electronic memory card also to include prepaid telephone units, thus providing very simple means for billing and paying for consulting the server.

Finally, in order to inform the user about message length, and thus the cost of consulting messages, it is preferable in the invention for said list of electronic messages to be accompanied by the number of words and/or the duration of each message.

DETAILED DESCRIPTION OF DRAWINGS

Figure 1:
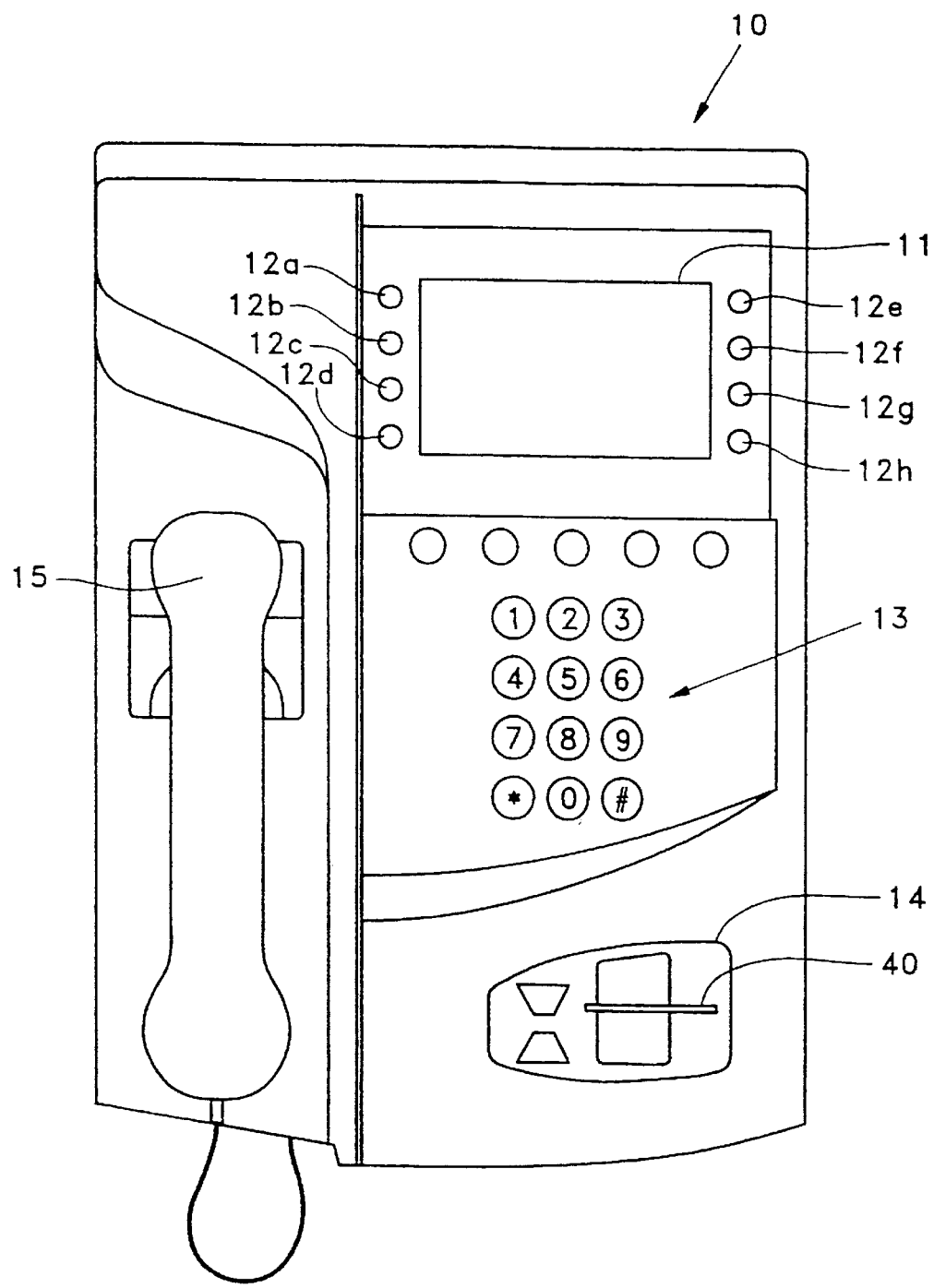
FIG. 1 is a front view of a telephone appliance in a voice consultation system of the invention.
Figure 3:
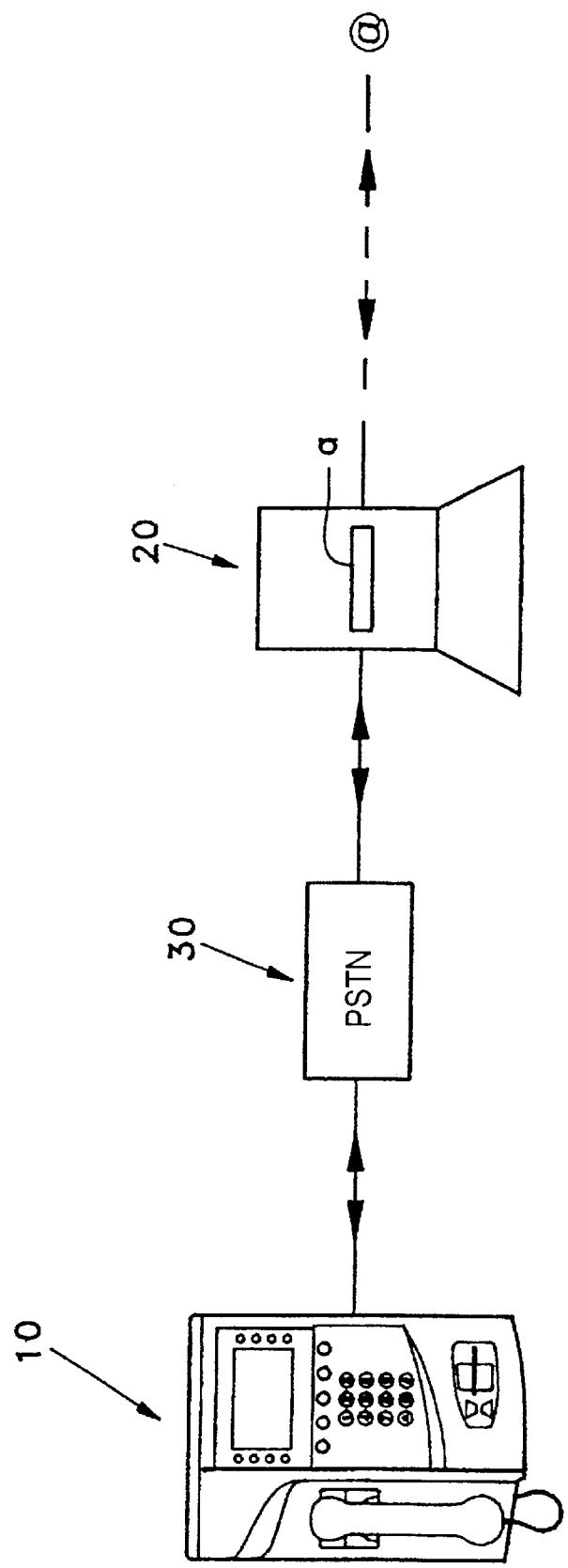
FIG. 3 is a diagram showing how the FIG. 1 telephone appliance is connected to an electronic mail server.

FIG. 1 shows a telephone appliance 10, e.g. a public telephone, forming part of a system for consulting an electronic mail server 20 which, as shown in FIG. 3, is connected to the appliance 10 via the public switched telephone network (PSTN) 30. Each user subscribing to the server 20 possesses an address a under which electronic messages for that user are recorded, which messages come from other servers via the Internet. The address a constitutes data identifying the user.

With reference to FIG. 1, it can be seen that the telephone appliance 10 has a display screen 11 and keys 12a, ..., 12h giving access to options displayed on said screen 11. In addition, the appliance 10 has a keypad 13, an electronic memory card reader 14, and a handset 15. In conventional manner, the reader 14 is designed to interchange information with prepaid telephone cards, issued by the telecommunications operator managing the telephone network, in this case the PSTN. As a call takes place, telephone units present in the card are consumed in succession as a function of the applicable rate of charge.

In the context of the system of the invention for consulting an electronic mail server, the reader 14 is also designed to communicate with electronic memory cards that constitute subscription cards with said server 20. To this end, each subscriber has a card 40 in which there is stored in particular data for identifying the user, namely the user's electronic mail address a and possibly a password.

Figure 2A:
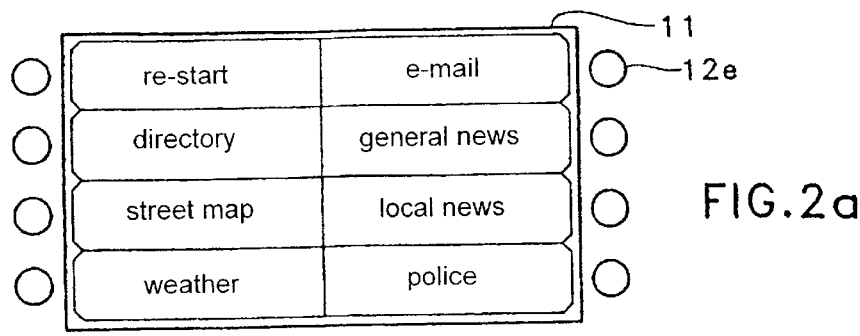
FIGS. 2a to 2e are front views of the display screen of the FIG. 1 telephone appliance at five successive stages in a consultation.
Figure 2B:
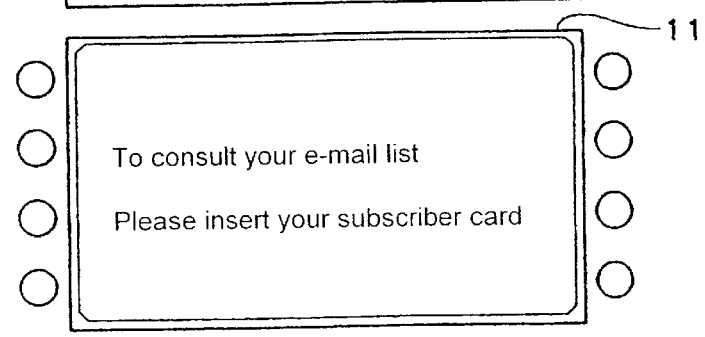
Figure 2C:
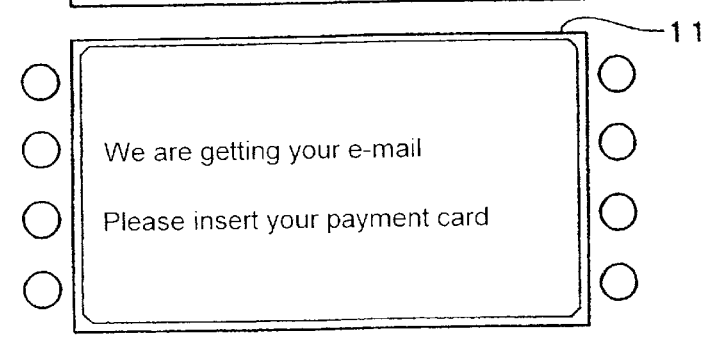
Figure 2D:
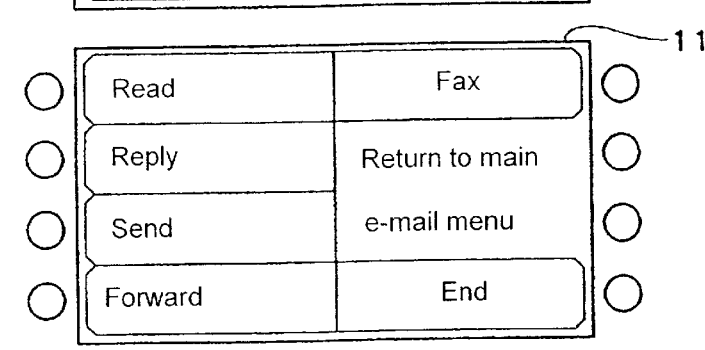
Figure 2E:
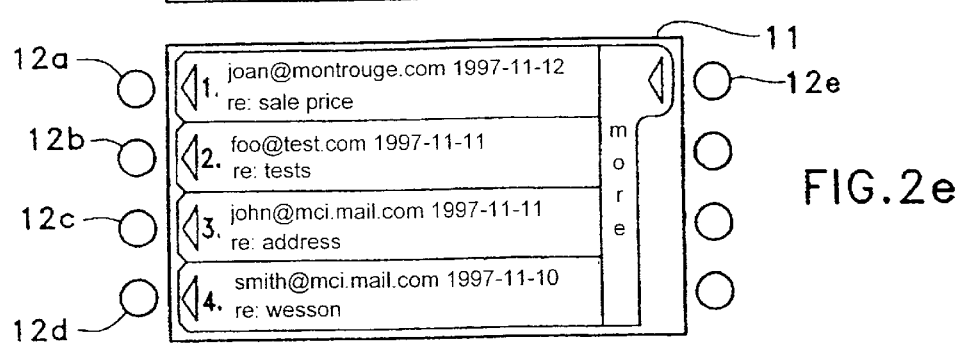

When a subscriber desires to consult an electronic mailbox at address a with the server 20, the user begins with a display of the home page on the display screen 11 of the telephone appliance 10 and selects the option "electronic mail" by means of access key 12e, as shown in FIG. 2a. A message then appears on the screen 11 inviting the user to insert the subscription card 40 in the reader 14 (FIG. 2b). After the card 40 has been inserted in the reader 14, the telephone appliance 10 uses the telephone network 30 to transmit to the server 20 the user's identity data, and in particular the address a, as read by the reader 14 so as to enable the server 20 to find the subscriber's mail. During this time, a waiting message is displayed on the display screen 11, possibly suggesting that the user insert a payment card such as an electronic purse or a bank card, for example (FIG. 2c). After conducting a search and after the payment card has been inserted, the electronic mail consultation service is available, since the server 20 has by now given the telephone appliance 10 a list of the electronic messages found at the subscriber's address a. The display screen 11 then appears in the form of a menu giving the user various choices (FIG. 2d). In particular, by pressing on key 12a, the user can access the "Read" option of the menu so as to take cognizance of electronic messages present at the user's address. In FIG. 2e, it can be seen that this list of messages is displayed on the display screen 11 as options made accessible by means of the keys 12a, ..., 12h. In the example shown, the first four messages appear on the screen in the form of summary data such as name of sender, date, and subject matter. If the number of messages is greater than four, the following part of the list can be obtained by pressing on the key 12e. To select a given message, e.g. the message numbered 3, the user must press the corresponding access key, in this case the key 12c. At this moment, the text of the message occupies the entire display screen 11, and the user has the option of making it scroll down and up by using the access keys which also make it possible to return to the menu of FIG. 2d. If, while the message is displayed on the screen 11, the user picks up the handset 15, then the text disappears from the screen and a voice synthesizer situated in the server 20 reads out the content of the message in voice form to the user via the telephone network 30. After reading or listening to the selected message, the user can select another by pressing on another access key, until there are no more messages.

The list of electronic messages displayed can optionally be accompanied by the number of words and/or the duration of each message in order to inform the user prior to selection about the length of each message.

In the embodiment shown in FIGS. 2a to 2e, the service is billed by means of a payment card separate from the subscription card 40. Nevertheless, it should be understood that said subscription card could contain prepaid units of monetary value which, in a manner analogous to telephone cards, are consumed in order to pay for consulting the server. Another method of payment would involves extracting the identity data of the user from the subscription card and in billing via the telephone operator.

Finally, provision can be made for the telephone appliance 10 also to have means enabling the user to take action on a selected message. These means are summarized in the menu of FIG. 2d. In non-limiting manner, a first possible action involves replying orally to the sender of said message. In this case, the user presses the access key 12b corresponding to "Reply" to the selected message, picks up the handset 15, if it has not already been picked up, and dictates the message after the beep. An electronic audio message is established and sent to the sender of the initial message.

The action "Send" consists in sending the same orally recorded message in the form of an electronic file to addresses selected by the user from a list displayed on the display screen 11.

The action "Forward" involves forwarding the most recently read message to addresses selected in the same manner as for the action "Send".

The action "Fax" also applies to the most recently read message, which message can be redirected to a fax number selected by the user, thereby conserving a paper copy of the message if no printer is available on the telephone appliance 10.

What is claimed is:

1. A system for consulting an electronic mail server (20) in which a plurality of electronic messages are recorded for a user under data (a) identifying that user, the system being characterized in that it comprises:

an electronic memory card (40) for storing said identity data (a; and a telephone appliance (10) comprising a handset (15), an electronic memory card reader (14), a display screen (11), and a plurality of access keys (12a, ..., 12h) positioned adjacent said screen for giving access to options displayed on said screen (11);

said telephone appliance (10) being suitable firstly for transmitting to said server (20) the identity data (a) as read by the electronic memory card reader (14), and secondly for displaying a list of received electronic messages returned from the server (20) that are presented as options on the display screen (11) and aligned in a respectively corresponding relationship to said access keys, the user selecting a message by pressing its correspondingly aligned access key (12*a*, . . . , 12*h*).

2. A system according to claim 1, characterized in that the telephone appliance (10) is suitable for displaying the message selected by the user on its display screen (11).

3. A system according to claim 1, characterized in that the telephone appliance (10) is suitable for transmitting the selected message in voice form when the handset (15) is picked up.

4. A system according to any one of claim 1, characterized in that said list of electronic messages is accompanied by the number of words and/or the duration of each message.

5. A system according to any one of claim 1, characterized in that said electronic memory card (40) also contains prepaid telephone units.

6. A system according to claim 5, wherein said telephone appliance deducts a given number of telephone units from said prepaid telephone units as a charge for accessing said electronic messages on said server.

7. A system according to any one of claim 1, characterized in that said user identity data comprises an electronic mail address (a).

8. A system according to claim 7, characterized in that the identity data also comprises a password.

9. A system according to any one of claim 1, characterized in that the telephone appliance (10) also comprises means enabling the user to take actions on the selected message.

10. A system according to claim 9, characterized in that said action-taking means are means for replying to and/or forwarding said message.

11. A system according to any one of claim 1, characterized in that said telephone appliance (10) is suitable for sending a message spoken orally by the user.

\* \* \* \* \*